(12) United States Patent
Walker

(10) Patent No.: US 6,630,948 B1
(45) Date of Patent: Oct. 7, 2003

(54) REMOTE CONSUMER INFORMATION SYSTEM

(76) Inventor: Brian B. Walker, 20311 - 215th Ave., Big Lake, MN (US) 55309

( * ) Notice: Subject to any disclaimer, the term of this patent is extended or adjusted under 35 U.S.C. 154(b) by 330 days.

(21) Appl. No.: 09/694,697

(22) Filed: Oct. 23, 2000

Related U.S. Application Data

(63) Continuation-in-part of application No. 09/481,618, filed on Jan. 12, 2000, now abandoned.

(51) Int. Cl.[7] .................................................. H04N 5/33
(52) U.S. Cl. ..................... 348/168; 348/270.1; 348/157
(58) Field of Search ........................... 348/168, 270.1, 348/157, 159, 135, 164, 61; 248/333, 744, 745; 705/14; 40/442, 471; 235/383, 431; H04N 5/33

(56) References Cited

U.S. PATENT DOCUMENTS

| | | | | |
|---|---|---|---|---|
| 3,970,379 A | * | 7/1976 | Fedder ........................ 352/52 |
| 4,071,740 A | * | 1/1978 | Gogulski ..................... 235/431 |
| 4,739,567 A | * | 4/1988 | Cardin ......................... 40/471 |
| 4,821,437 A | * | 4/1989 | Abramson et al. ............ 40/658 |
| 5,111,196 A | * | 5/1992 | Hunt ......................... 340/5.91 |
| 5,123,192 A | * | 6/1992 | Hsieh ......................... 40/442 |
| 5,250,789 A | * | 10/1993 | Johnsen ........................ 705/14 |
| 5,280,932 A | * | 1/1994 | Folsom .................. 280/33.992 |
| 5,358,094 A | * | 10/1994 | Molinaro et al. ......... 198/502.1 |
| 5,361,871 A | * | 11/1994 | Gupta et al. ................... 186/61 |
| 5,406,271 A | * | 4/1995 | Sonnendorfer et al. ..... 340/5.91 |
| 5,483,299 A | * | 1/1996 | Minoura ..................... 348/745 |
| 5,570,138 A | * | 10/1996 | Baron ......................... 348/744 |
| 5,612,741 A | * | 3/1997 | Loban et al. ................ 348/383 |
| 5,620,061 A | * | 4/1997 | Fraser .......................... 186/68 |
| 5,798,864 A | * | 8/1998 | Sekiguchi ................... 359/559 |
| 6,146,146 A | * | 11/2000 | Koby-Olson ................ 434/159 |
| 6,256,061 B1 | * | 7/2001 | Martin et al. ............ 348/222.1 |
| 6,353,468 B1 | * | 3/2002 | Howard et al. ............. 352/100 |
| 6,415,555 B1 | * | 7/2002 | Montague ................... 52/36.2 |
| 6,435,407 B1 | * | 8/2002 | Fiordelisi .................... 235/383 |

* cited by examiner

Primary Examiner—Nhon Diep
(74) Attorney, Agent, or Firm—Jacobson and Johnson

(57) ABSTRACT

A consumer information projection system composed of a remote control unit such as a microcomputer which sends commands through the Internet to an on-site central processing unit that will control the images produced by at least one digital imager within a building. The projector or projectors create an information carrying image that is generated on a viewable surface for a customer to see. If desired the customer can orally request product information by speaking into a voice recognition system that controls a database of product specific information that is deliverable in either visual or audio form or both.

7 Claims, 4 Drawing Sheets

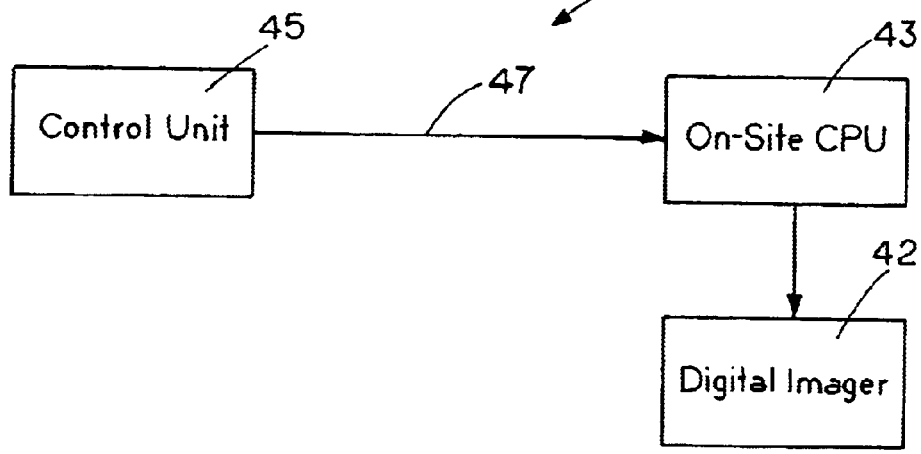
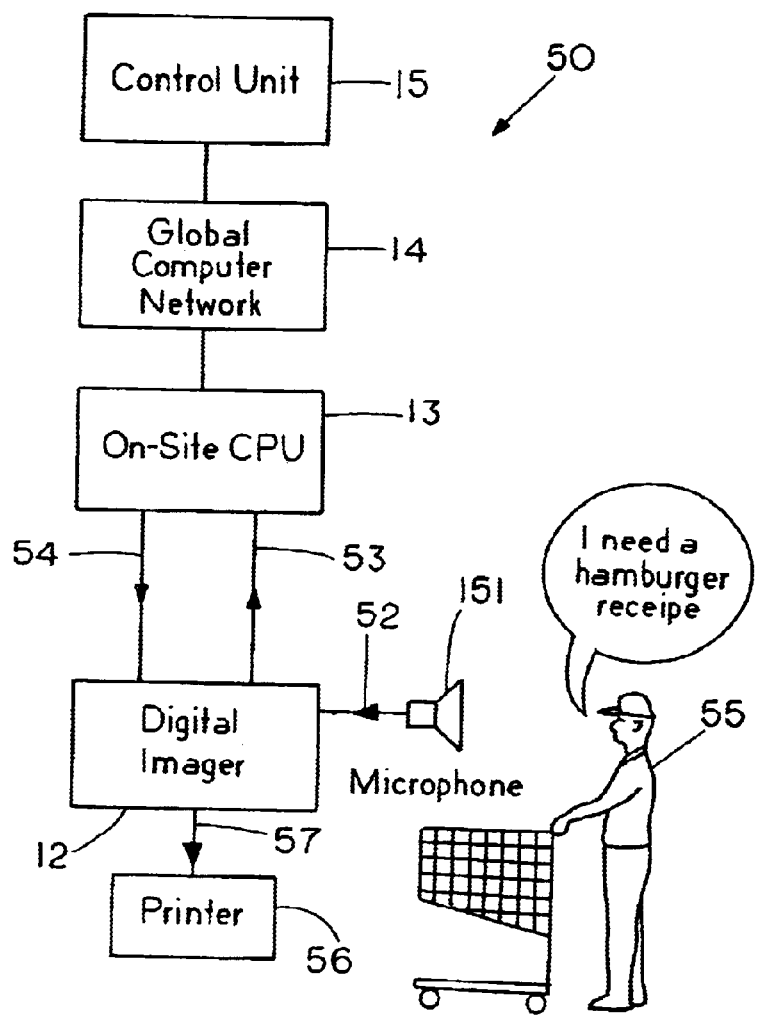

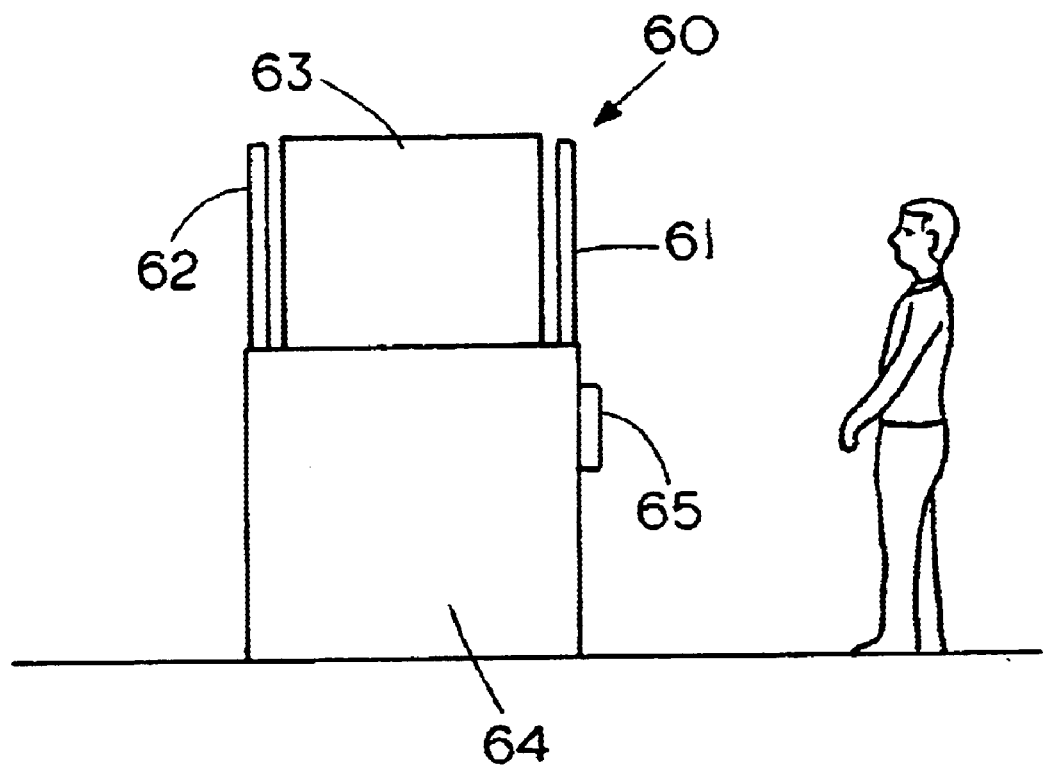

REMOTE CONSUMER INFORMATION SYSTEM

CROSS REFERENCE TO RELATED APPLICATIONS

This application is a continuation-in-part of my application titled Remote Consumer Information System, Ser. No. 09/481,618 filed Jan. 12, 2000, now abandoned.

FIELD OF THE INVENTION

This invention relates generally to projection systems, and more specifically to remotely controlled networked projection systems that projects on-site consumer information in a conspicuous location within a commercial area.

BACKGROUND OF THE INVENTION

In the field of providing consumers information about products, a large number of methods and devices exist to convey information about potential purchases. Unfortunately, most of these devices and methods are physical in nature, such as cards and placards placed around products, or an abundance of minuscule tags that meld into a sea of non-meaning when grouped near one another. Many of the physical methods used to convey information take up valuable floor space within a building, congesting pedestrian traffic flow. Another drawback of physical methods and devices to convey information to potential consumers is the static nature of the devices. Price changes, availability changes, comparison information changes, all must be done manually, and at each physical location where a physical information device exists. The process of changing these devices to update current conditions is time consuming and laborious. If a retailer, producer, manufacturer or other trader of goods has outlets in multiple locations, this process of changing physical information devices can become a logistical nightmare. A further disadvantage is that the consumer often lacks control of the information being displayed.

Therefore, it is an object of this invention to create an information conveyance system that does not physically interfere with customers or potential customers.

It is an object of this invention to create an information conveyance system that can replace existing physical information conveyance devices to provide more floor room and ease congestion within a building.

It is a further object of this invention to create an information system wherein the information that the system conveys can be changed rapidly, uniformly, and globally, to allow an information manager easy and quick access to know what his or her customers are viewing.

It is a further object of this invention to create an information projection system wherein the images projected can be altered from a remote location.

It is a further object of this invention to create an information projection system for providing consumer product information to an on-site processing from a remote location.

It is a further object of this invention to create an information projection system wherein the images selected for projecting can be obtained form a computer database by voice commands from a consumer positioned proximate the image projections system.

It is a further object of this invention to provide the consumer with an ability to override the system to enable the consumer to obtain relevant product specific information in either audio or visual form or both.

SUMMARY OF THE INVENTION

The invention comprises a consumer information system to be incorporated in a building that generates images upon a surface viewable by customers, with the at least one image controllable by a remote unit situated physically away from the imagers. In one embodiment the remote unit connects via the Internet to an on-site central processing unit and instructs a digital imager which images to project. The digital imagers are positionable at various locations within a building, and can convey images of varying size, shape, color and text, to provide potential consumers information about a prospective purchase. The information can be generated on portions of the building or on kiosks. In addition the database of the on-site central processing unit includes selective consumer reference information material and voice recognition software so that a consumer can override the preprogrammed projected images to orally request specific information on use of a stores products.

BRIEF DESCRIPTION OF THE DRAWINGS

FIG. 4 shows an alternate embodiment illustrating the control mechanism of the consumer information projection system.

FIG. 5 shows a partial schematic diagram of a consumer information system having a database and voice recognition software in the processing unit to enable a consumer to obtain product specific information through voice commands.

FIG. 6 shows an island kiosk with multiple screens for projecting visual and audio information on products to a consumer.

DESCRIPTION OF THE PREFERRED EMBODIMENT

Figure 1:
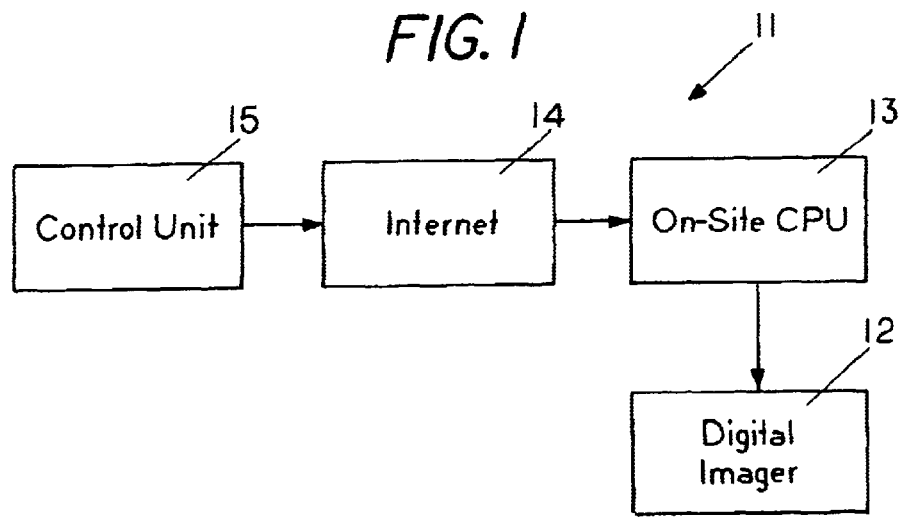
FIG. 1 is a schematic diagram illustrating the control mechanism of the consumer information projection system.

FIG. 1 shows a schematic of the preferred embodiment of my consumer information projection system 11. Reference numeral 12 indicates an image projector such as the Proxima® Projector 9250 which can be positionably located within a building. It should be understood that the terms projector and digital imager will be used interchangeably throughout the specification. It should also be understood that while for the sake of simplicity the schematic shows only a single digital imager 12, the consumer information projection system 11 is designed to include at least one digital imager. The consumer information projection system 11 includes an on-site central processing unit (hereater OSCPU) 13 which carries out the commands given to the digital imagers located throughout the building. The OSCPU 13 is linked to an off-site control unit 15 via the Internet 14. The off-site control unit 15 sends commands through the Internet 14 and to the OSCPU instructing the digital imagers 12 which images to display, their current activation status, and so forth. Typically, the off-site control unit 15 is a microcomputer, such as an Apple® Power Macintosh® G3 or the like, that allows a user to easily interface with the OSCPU from a remote location. Through this arrangement, an individual can control the activity and status of the digital imagers 12 within a building in a remote location. The arrows linking the schematic boxes together in FIG. 1 show command order direction, but it should be understood that information can flow both ways, thus enabling the individual to monitor the status of the digital imagers 12 in a remote location.

Figure 2:
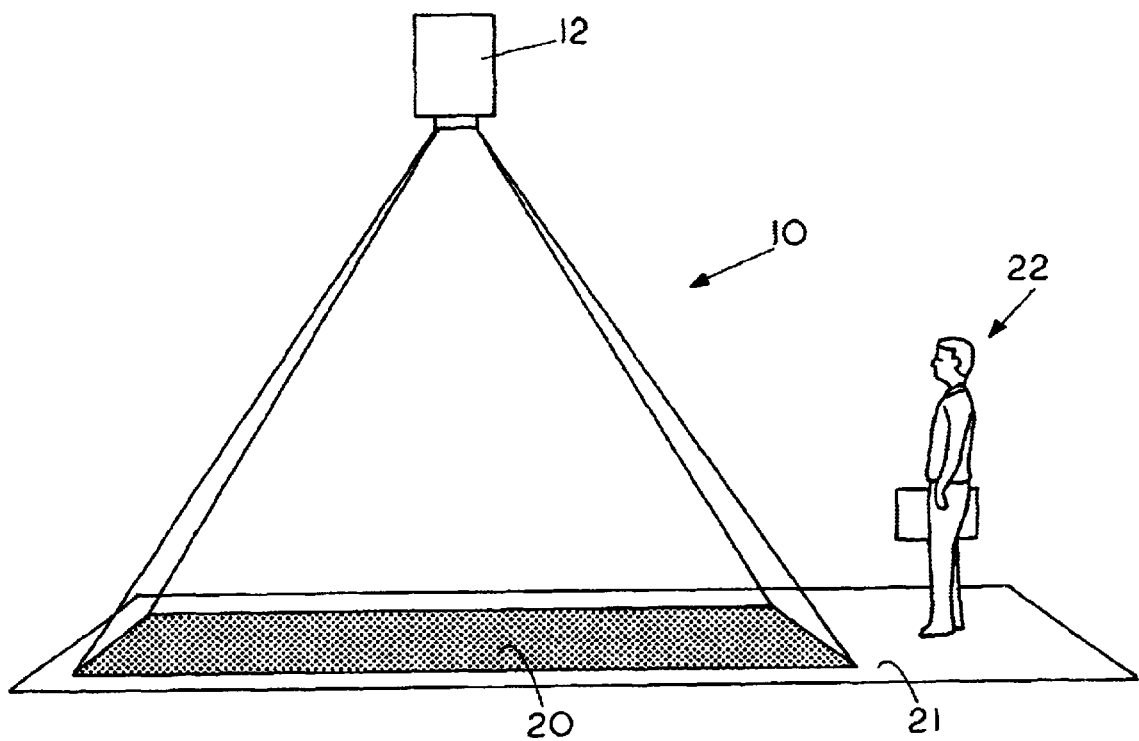
FIG. 2 shows a side view of the consumer information projector projecting an image onto a visible floor surface for a customer to see.

FIG. 2 shows a physical embodiment of a digital imager placed within a building. The digital imager 12 in this case is suspended over the floor 21. An individual 22 located within the building and standing on the floor 21 can see the image 20 that is projected downward from the digital imager 12. The individual 22 can then see and analyze the information contained within the image 20, information that could be associated with a specific nearby product. Reference numeral 10 generally identifies the combination of the digital imager together with the image produced 20. While the image 20 produced in FIG. 2 is rectangular in shape, it should be understood that the digital imager could produce an image field of varying size, shape, color, and/or text. While FIG. 2 shows an image projected onto a portion of the building it is understood that an image can also be generated on a television monitor or the like.

Figure 3:
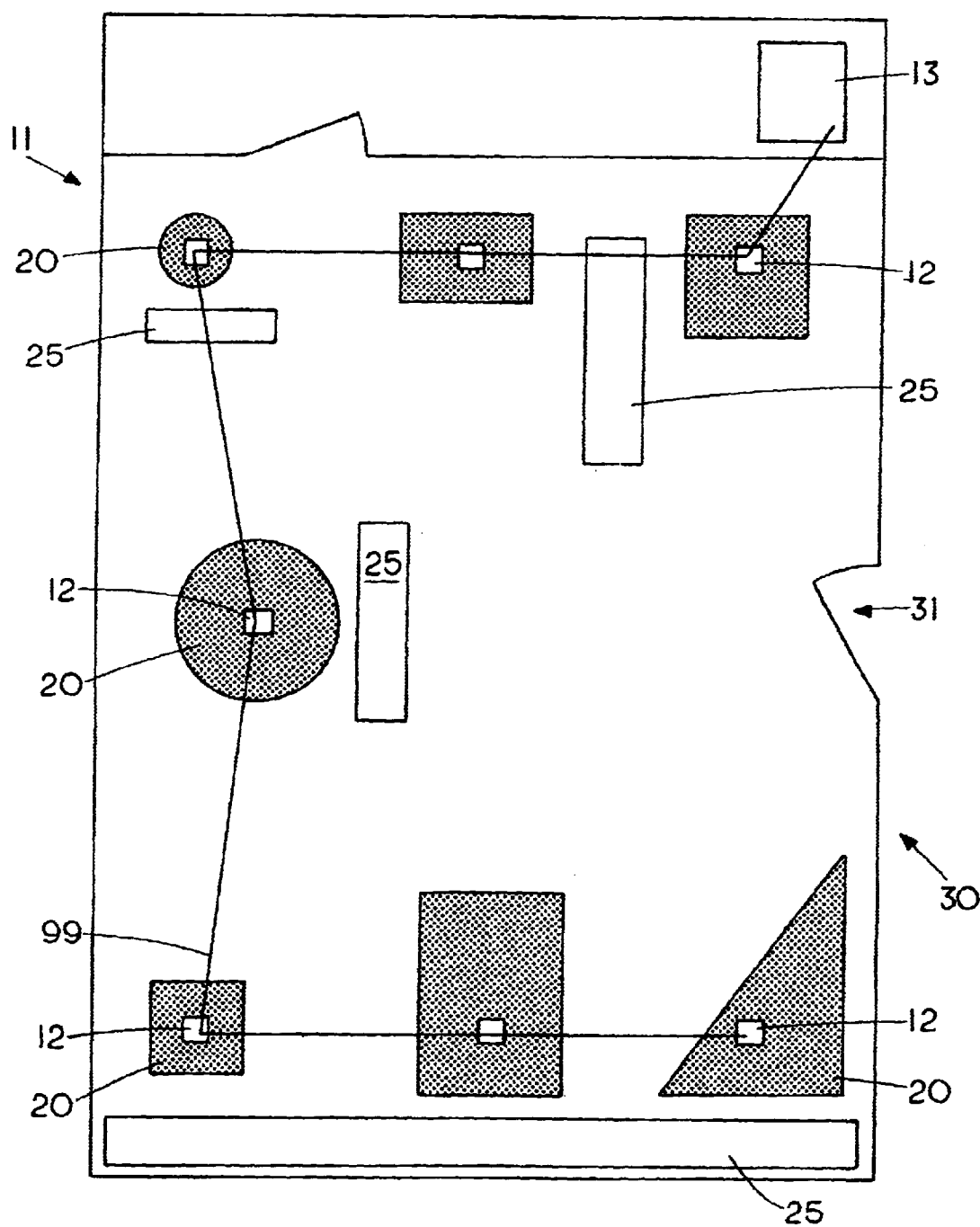
FIG. 3 shows is a top view of a building with multiple consumer information projectors in operation.

FIG. 3 shows the computer controllable digital imager network located within a building 30. A series of projectors 12 are positionably located within the building 30. These digital imagers 12 project images 20 throughout various regions of the building. These images 20 are intentionally located proximate item shelving 25. Notice that the images 20 exist in various shapes throughout the building 30. All of the digital imagers are linked back to the OSCPU 13. The OSCPU controls which images are displayed at any one time, the form of the images, and the information they contain. In one example of the consumer information projection system 11, the building 30 is a produce module within a grocery store. A customer enters through door 31, examines the items on item shelving 25, and gathers information from the images 12 projected upon the floor about the nutritional content of the nearby items, their cost, cost per pound, and other relevant information. An advantage of having the digital imagers 12 in an overhead position as shown in FIG. 3 is that consumers are allowed to walk through the image to get to another area within the building 30. This can reduce the congestion within the building 30 as less space is taken up by physical informational placards and the like. While the OSCPU 13 directly controls the digital imagers connected to it, it is the off-site control unit 15 running through the 14 which sends control commands to the OSCPU 13 to control the activity of the digital imagers 12 within the building 30. In this way, a remote user can control the function of several digital imagers 12 at once within a single building 30, but also, the remote user can control the function of a plurality of consumer information projection systems within a specified area. Therefore, if there is a change in information about a displayed product (such as a price change), or an actual change in the product carried (from rakes to snow shovels for instance), a user in a remote location can update the information to make it current.

FIG. 4 shows a schematic of an alternate embodiment of my consumer information projection system 41. Reference numeral 42 indicates an image projector which can be positionably located within a building. The consumer information projection system 41 includes an on-site central processing unit 43 which carries out the commands given to the digital imagers located throughout the building. The OSCPU 43 is linked to an off-site control unit 45 via a direct physical line or a wireless signal (both depicted by numeral 47). The off-site control unit 45 sends commands through to the OSCPU instructing the digital imagers 42 which images to display, their current activation status, and so forth. Again, while the arrows linking the schematic boxes together in FIG. 4 show command order direction, it should be understood that information can flow both ways, thus enabling the individual to monitor the status of the digital imagers 42 in a remote location.

In operation, at least one digital imager 12 would be positionably located within a building 30. The digital imagers would be connected to an on-site central processing unit 13 forming a local network between the imagers and the on-site central processing unit. The on-site central processing unit 13 would be connected to a remote control unit 15 via the, a direct line, or a wireless signal. From a remote area, a user can use the microcomputer to give instructions through the 14 to the on-site central processing unit 13, whereupon the code can be translated into commands that are carried out by the digital imagers 12 regarding activation status, message displayed and so forth. A customer entering the building 30 would perceive the information located within the image 20 about a potential purchase product and make a decision about whether to purchase the product at that time.

FIG. 5 shows a consumer information system 50 comprising control unit 15, a global computer network 14 and an onsite processor 13 (OSCPU) which is connected to a digital imager 13. System 50 is similar to the system shown in FIG. 1 except a microphone 51 is positioned proximate the digital imager and connects to OSCPU 13 through leads 52 and 53. OSCPU 13 includes voice recognition software and a database that includes product specific information. The product specific information is preferably loaded into the OSCPU at the store site and can be presented to the customer either in visual or audio format. Connected to OSCPU 13 is a printer 56, which allows a consumer to print out information that is projected on the imager.

In operation of the system 50 a consumer 55 approaches a digital imager 12 and speaks into the microphone 51. A voice signal, such as "I need a hamburger recipe" is received by microphone 51 which transits the signal to OSCPU 13 where the voice recognition software therein converts the voice signal into a command that access the database to retrieved the product specific information, which is then sent to digital imager 54. The digital imager 54 projects the information to the consumer. As part of the system audio information can also be sent with the product specific information so that the consumer receives both an audio and visual signal. If the consumer finds the information useful the consumer can voice a command to "print" which sends a further signal to the OSCPU 13 which directs the printer 56 to print the information on digital imager 12.

In general the invention compeers a method of displaying information to consumers within a commercial space having a viewable surface comprising the steps of:
 (a) placing an imaging system within the commercial space;
 (b) connecting the imaging system to a first computer located in the commercial space;
 (c) placing a second computer in a remote location from the first computer;
 (d) connecting a second computer to the first computer through a data transmission system to thereby enable the second computer to send data to the first computer so that the second computer located at the remote location can direct and control the images projected from the imaging system onto the viewable surface. If preferred one can use a global computer network, a wireless system or a direct line as the data transmission system.

If the system of FIG. 5 is used a method of interactive displaying information to consumers within a commercial space having a viewable surface comprising the steps of:

(a) placing an imaging system within the commercial space;

(b) connecting the imaging system to a first computer located in the commercial space;

(c) placing a second computer in a remote location from the first computer;

(d) connecting a second computer to the first computer through a data transmission system to thereby enable the second computer to send data to the first computer so that the second computer located at the remote location can direct and control the images projected from the imaging system onto the viewable surface.

(e) loading consumer activateable information into the second computer, (f) connecting a microphone proximate the imaging system to the second computer (g) loading voice activateable software into the second computer; and (h) connecting a printer to the second computer.

With the system 50 a consumer 55 proximate the imaging system 12 views the screen and decides that he or she needs further information. To obtain further information the consumer 55 takes the following steps:

(a) voices a command to the microphone 51

(b) the voice command is sent to the second computer 31;

(c) the second computer receives the voice command and converts the voice command to digital instructions that sends the response to the digital imager 12; and (e) the consumer 55 views the visual information on the imaging system 12 and receives audio information through a microphone/speaker 51.

While the visual images can be projected onto the floor to provide consumer information the present invention is well suited for use with island kiosks as shown in FIG. 6. The island kiosk 60 includes a support stand 64 and a first set of opposing screens 61 and 62 and a second set of opposing screens comprising screen 63 and a further screen (not shown) placed opposite of screen 63. A speaker and combination microphone 65 is mounted on the kiosk so that the voice signals can be sent and received therefrom while the visual images can be received by one or all four of the kiosk screens.

I claim:

1. A computer controllable digital imager network comprising:

a building, said building having an area for consumers to purchase goods and services;

a floor in said building for consumer pedestrian traffic;

a plurality of digital imagers, said plurality of digital imagers located throughout said building, each of said plurality of digital imagers producing consumer information images on the floor of said building, said digital images permitting a consumer to both walk on the consumer information images as well as to view the consumer information images to thereby avoid reducing the amount of the floor in the building that is available for consumer pedestrian traffic;

an on-site central processing unit, said on-site central processing unit acting as the local control mechanism for said digital imagers; and an off-site control unit, said off-site control unit being in a location different from said on-site central processing unit, said off-site control unit connected to said on-site central processing unit.

2. The computer controllable digital imager network of claim 1 wherein said plurality of digital imagers are linked to said on-site central processing unit.

3. The computer controllable digital imager network of claim 1 wherein the on-site central processing unit is a microcomputer.

4. The computer controllable digital imager network of claim 1 wherein the off-site control unit is connected to said on-site central processing unit through the global computer network.

5. The computer controllable digital imager network of claim 1 wherein the off-site control unit is connected to the on site central processing unit through a direct line.

6. The computer controllable digital imager network of claim 1 wherein the off-site control unit is connected to the on site central processing unit through a wireless signal.

7. The computer controllable digital imager network of claim 2 wherein said plurality of digital imagers project consumer information onto an island kiosk viewable by consumers.

* * * * *